United States Patent [19]

Watt

[11] 3,998,207

[45] Dec. 21, 1976

[54] DIFFERENTIAL TEMPERATURE CONTROLLER FOR USE IN A SOLAR ENERGY CONVERSION SYSTEM

[75] Inventor: Richard Edwin Watt, San Diego, Calif.

[73] Assignee: Richard Edwin Watt, San Diego, Calif.

[22] Filed: Jan. 26, 1976

[21] Appl. No.: 652,640

[52] U.S. Cl. .............................. 126/271; 126/400
[51] Int. Cl.² ........................................ F24J 3/02
[58] Field of Search ................. 126/270, 271, 400; 237/1 A; 165/18, 47

[56] References Cited
UNITED STATES PATENTS

| | | | |
|---|---|---|---|
| 3,262,493 | 7/1966 | Hervey | 126/271 |
| 3,299,881 | 1/1967 | Koch | 126/271 |
| 3,321,012 | 5/1967 | Hervey | 126/271 |
| 3,931,806 | 1/1976 | Hayes | 126/400 |
| 3,949,732 | 4/1976 | Reines | 126/270 |

*Primary Examiner*—Kenneth W. Sprague
*Attorney, Agent, or Firm*—Brown & Martin

[57] ABSTRACT

An integrated circuit dc-comparator compares voltage signals representative of sump water and collector water temperatures in a solar energy conversion system and continuously provides a direct current voltage signal from the time that it is sensed that the collector water is 11° F warmer than the sump water, until such time as it is sensed that the collector water is only 2° F warmer than the sump water. The integrated circuit is latched to provide the continuous dc signal notwithstanding variations in noise level, by a resistor connected between the integrated circuit output terminal and the integrated circuit input terminal at which the collector water temperature is sensed. The direct current voltage signal gates-on a sensitive gate thyristor which in turn provides a gating signal to a high power thyristor connected in cascade therewith to enable the high power thyristor to energize a pump motor for pumping water between the solar energy system collector and sump until a temperature difference of only 2° F between the collector water and sump water temperatures is sensed. The integrated circuit may be inhibited from providing the direct current voltage signal for enabling the pump motor whenever the sump water temperature exceeds a certain upper limit notwithstanding the difference between the sump water and collector water temperatures.

23 Claims, 4 Drawing Figures

DIFFERENTIAL TEMPERATURE CONTROLLER FOR USE IN A SOLAR ENERGY CONVERSION SYSTEM

BACKGROUND OF THE INVENTION

The present invention generally pertains to electrical controllers and is specifically directed to temperature responsive controllers for use in controlling the circulation of water in solar energy conversion systems of the type wherein water is circulated between a solar energy collector and a water storage sump to transfer heat energy to the sump.

A prior art solar energy conversion system is shown in FIG. 1, Energy from the sun is collected in a solar collector system 20, and heats water contained therein. Water is circulated by a pump 21 between the collector system 20 and a water storage sump 22 through pipes 23 and 24 to heat the water in the sump 22. A pump motor 25 is controlled by an electrical controller 26. Connected to the controller 26 are a sensor 27 for sensing the temperature of the collector water and a sensor 28 for sensing the temperature of the sump water. Signals representative of these temperatures are provided on lines 29 and 30 to the controller 26. In response to a comparison of the sensed temperatures of the collector water and sump water, the controller controls the energization of the motor 25 as represented figuratively by line 31 in FIG. 1.

Whenever it is sensed that the collector water temperature is greater than the sump water temperature by a predetermined difference, the controller connects the pump motor with an electrical power source to cause the pump to circulate water between the collector and the sump. When the predetermined difference no longer is sensed, the pump motor is disconnected from the power source. Prior art controllers contain relays for connecting the pump motor (typically an induction motor) to an AC power source.

SUMMARY OF THE INVENTION

The controller according to the present invention contains a thyristor semiconductor switch for connecting the pump motor to an electrical power source to cause circulation of the water. The use of a thyristor switch makes possible an all solid state controller, with inherently better reliability.

The controller compares the sensed temperatures and provides a first indication when it is sensed that the collector water temperature has become greater than the sump water temperature by a first predetermined difference (such as 11° F), and provides a second indication when it is sensed that the collector water temperature has become greater than the sump water temperature by a second lesser predetermined difference (such as 2° F). The thyristor switch connects the motor to the power source when the first indication is provided, and disconnects the same when the second indication is provided.

The controller is latched to continuously provide the first indication from the time that it is sensed that the temperature of the collector water has become greater than the temperature of the sump water by the first predetermined difference until such time as it is sensed that the temperature of the collector water has become greater than the temperature of the sump water by the second lesser predetermined difference. The controller also is latched to continuously provide second indication from the time that it is sensed that the temperature of the collector water has become greater than the temperature of the sump water by the second lesser predetermined difference until such time as it is sensed that the temperature of the collector water has become greater than the temperature of the sump water by the first predetermined difference.

Latching prevents motor chatter, such as would otherwise occur due to difficulties in switching point determination because of noise and extremely slow temperature changes at the sensor inputs.

The controller preferably includes an integrated circuit for comparing the sensed temperatures and for providing a direct current voltage signal as the first indication when the first predetermined difference has been sensed and a zero voltage signal as the second indication when the lesser second predetermined difference has been sensed.

The thyristor switch preferably includes a first thyristor load switching element for switching the motor into connection with the power source in response to a gating signal, and a second thyristor in cascade therewith for providing this gating signal when gated on itself in response to the first indication provided by the controller. In this particular embodiment, the individual case of the first thyristor load switching element is directly grounded to the metal casing of the controller in order to dissipate heat generated in the first thyristor without subjecting anyone touching the controller casing to possible electrical shock hazard.

In solar energy conversion systems wherein the water storage sump is a swimming pool, the controller compares the sensed sump water temperature with a fixed value and inhibits the pump from circulating water between the sump and the collector, when it is sensed that the sump water temperature has become greater than the fixed value.

When a solar energy conversion system is used in cold climates, it becomes necessary to dump the collector water and to inhibit the pump motor when the collector water temperature becomes sufficiently close to freezing. For such applications, the controller compares a sensed collector temperature with a fixed value and inhibits the pump from circulating water when it is sensed that the collector temperature has become less than the fixed value.

A controller according to the present invention may be used in systems other than solar energy conversion systems, wherein some electrical load other than a pump motor is to be connected to an electrical power source and/or wherein some physical characteristic of a source other than temperature is sensed.

DESCRIPTION OF THE PREFERRED EMBODIMENT

Figure 1:
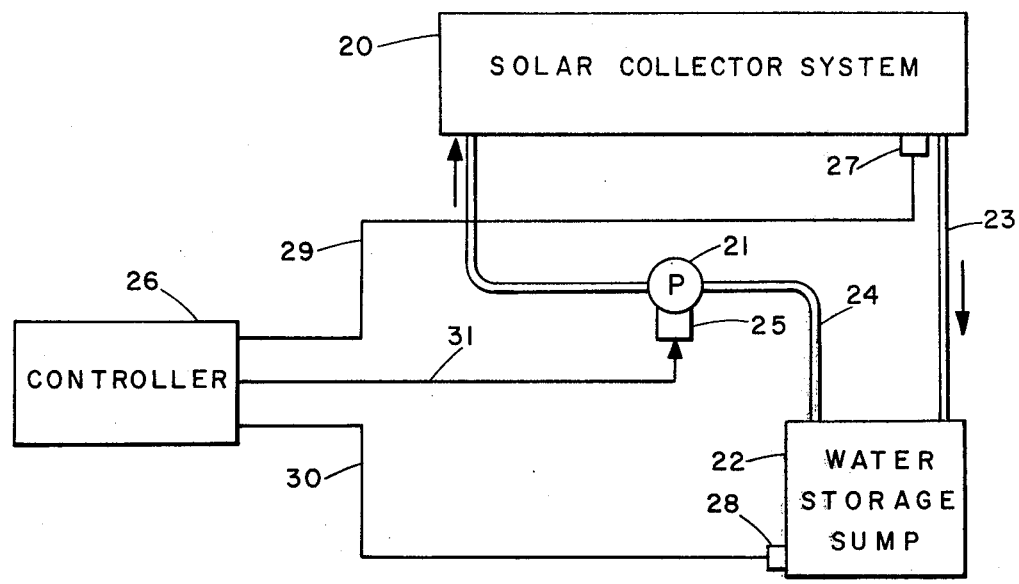
FIG. 1 is a block diagram showing aspects of the solar energy conversion of the present invention that are in common with the prior art.
Figure 2:
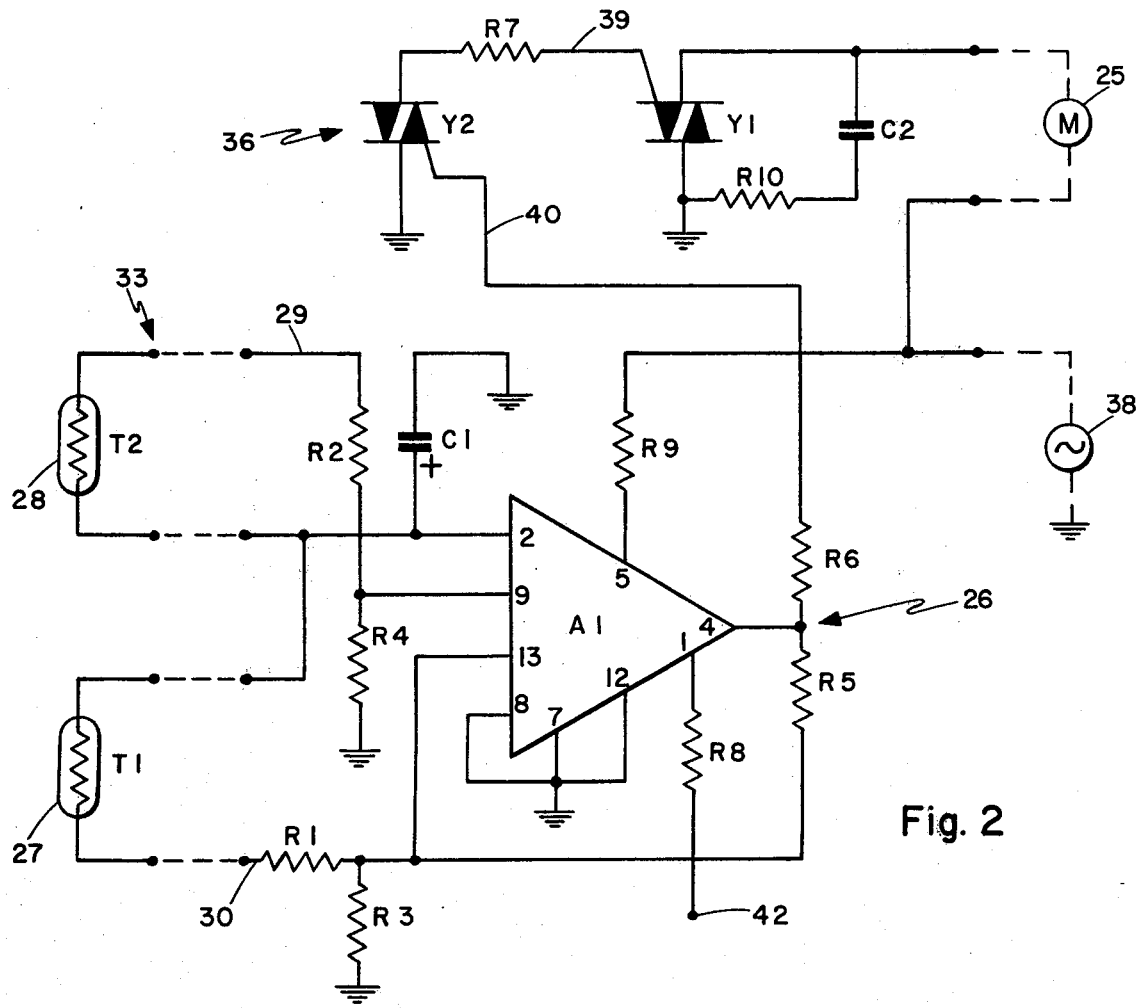
FIG. 2 is a schematic circuit diagram showing a differential temperature controller according to the present invention.

A differential temperature controller for use in a solar energy conversion system is shown in FIG. 2. A thermistor bridge circuit 33 is coupled to an integrated circuit A1. The thermistors 27 and 28 are negative temperature coefficient (NTC) thermistors and together with resistors R1 and R2 form one-half of the bridge 33. The other half of the bridge 33 is formed by resistors R3 and R4.

The integrated circuit A1 is an RCA CA3059 "zero voltage switch". The manufacturer specified terminal designations for this integrated circuit A1 that are utilized in the controller are shown in the Drawing. This particular integrated circuit A1 may be operated as a dc-comparitor when the terminals thereof are connected as shown in the Drawing. In this mode of operation, the action of the zero crossing detector therein is overridden, and a continuous direct current voltage signal is provided at output terminal 4 whenever the voltage signal provided at input terminal 13 is positive with respect to the voltage signal provided at input terminal 9, and a zero voltage signal is provided at output terminal 4 whenever input terminal 13 is not positive with respect to input terminal 9.

Voltage signals representative of the sensed collector water temperature and sump water temperature are provided by thermistors T1 and T2 to the differential comparitor input terminals 13 and 9, respectively, of the integrated circuit A1. The output signal from terminal 4 of the integrated circuit A1 controls the operation of the thyristor load switching circuit 36.

The thyristor load switching circuit 36 operates to connect and disconnect the pump motor 25 with an alternating current power source 38. The pump motor 25 is an induction motor. The thyristor load switching circuit 36 includes cascaded triac thyristors Y1 and Y2. The motor 25 is switched into connection with the power source through the tyristor Y1 when the thyristor is gated on in response to a gating signal on line 39 from the thyristor Y2. Thyristor Y2 is gated on when the direct current voltage signal is provided on line 40 from the output terminal 4 of the integrated circuit A1.

In the preferred embodiment of the differntial temperature controller for use in a solar energy conversion system, the values of R3 and R4 are set to provide an approximate turn-on differential of $11° \pm 2°$ F. That is, the thermistor sensor T1 must sense a collector water temperature of at least 11° F above the sump water temperature sensed by the thermistor T2 for turn-on of the motor 25 to take place. Turn-off will occur when the collector water temperature is sensed by thermistor T1 to be $2° \pm 2°$ F above the sump water temperature sensed by the thermistor R2.

Positive latching action is provided by a feedback resistor R5 to prevent oscillations in the areas of turn-on and turn-off due to slow temperature cross-over transitions of the two thermistors T1, T2. The feedback resistor R5 is connected between the integrated circuit output terminal 4 and the integrated circuit input terminal 13. When the differential comparitor turns on in response to the voltage signal at the terminal 13 going positive with respect to the voltage signal at the integrated circuit input terminal 9, the voltage at the integrated circuit output terminal 4 goes from 0 volts dc to +5 volts dc. The feedback action through the resistor R5 pulls the input terminal 13 further positive with respect to the input terminal 9 and latches the output terminal 4 to the +5 volts dc potential. Essentially, the resistor R5 is in parallel with the resistor R3 when the output terminal 4 is at 0 volts dc. This requires that the temperature sensed by the thermistor T1 to become approximately 11° F greater than the temperature sensed by the thermistor T2 for the potential at the input terminal 13 to be more positive than the potential at the input terminal 9. When terminal 13 becomes positive with respect to terminal 9, the output terminal 4 goes to +5 volts dc. The feedback resistor R5 is then in parallel with the thermistor T1 and the resistor R1, which further pulls the input terminal 13 positive, establishing a latch condition.

With the resistor R5 in parallel with the thermistor T1 and the resistor R1 (and with terminal 4 at +5 volts dc), the integrated circuit A1 remains latched until the sump temperature sensed by the thermistor T2 becomes only $2° \pm 2°$ F below that of the collector water temperature sensed by the thermistor T1. At this point, the potential at terminal 13 goes negative with respect to terminal 9 and the potential at output terminal 4 goes to 0 volts dc. The resistor R5 now parallels the resistor R3 and the integrated circuit A1 is latched to provide a zero voltage signal until a 11° F temperature difference is again sensed. This latching action is required to prevent the potential at the output terminal 4 from oscillating between 0 volts dc and +5 volts dc, due to noise at the comparitor inputs terminals 9 and 13 at approximately zero volts differential. An oscillating signal at the output terminal 4 would cause the thyristor switching circuit 36 to turn the motor 25 on and off until the differential input magnitude was greater than that of the noise.

The thyristor load switching cicuit 36 provides the power switching function for a variety of loads and power factors (phase angles) from 0° to 90°.

The thyristor switching circuit 36 is cascaded in order to provide sufficient switching drive current to the power thyristor Y1 so that it can operate from the rather limited current (about 5 ma.) available from the integrated circuit output terminal 4. Direct current operation is used for gating rather than trigger pulses, because load phase angle is not critical to this mode of switching. Also, through this design, the case of Y2 can be directly grounded for heat sinking purposes without subjecting the user to possible electrical shock hazard. The thyristor load switching circuit 36 responds to about 5 ma at +3 volts dc. The sensitive gate thyristor Y2 is gated-on by the +5 volt direct current voltage signal provided on line 40 from the output terminal 4 via the resistor R6. Thyristor Y2 supplies the gate current to the thyristor Y1 via the resistor R7. Switching of the thyristor Y2 is automatically accomplished when sufficient gate drive current (3-4 ma) is applied to its gate and the AC potential rises above or below ground. The thyristor Y2 then supplies the required gate drive current to the Thyristor Y1 regardless of the power factor of the motor 25, for so long as the dc gate drive signal is applied to thyristor Y2. The large gate drive current supplied by the thyristor Y2 to the gate of the thyristor Y1 allows most any model of high power thyristor Y1 to be used.

The values ratings and/or identities of the components shown in FIG. 2 are as follows:

THERMISTORS

T1: 3,000 ohms, 25° C

T2: 3,000 ohms, 25° C

RESISTORS

R1: 511 ohms
R2: 511 ohms
R3: 4,640 ohms
R4: 4,990 ohms
R5: 42,200 ohms
R6: 750 ohms
R7: 200 ohms
R8: 10,000 ohms
R9: 5,000 ohms
R10: 100 ohms

CAPACITORS

C1: 150 uf, 16 volts
C2: 0.068 uf

INTEGRATED CIRCUIT

A1: RCA CA3059

THYRISTORS

Y1: RCA T4700B or Hutson 6T215, 15 amp
Y2: RCA T2300B

The motor is operated at 120 volts ac. The controller 26, described herein with reference to FIG. 2, provides differential temperature control over a temperature range of from 32° F to 212° F. At a water storage temperature of 140° F, the pump 21 turn-on temperature is 151° ± 2° F and the turn-off temperature is 142°±2° F.

The integrated circuit A1 also contains an inhibit input terminal 1. When a direct current voltage input signal of about +3 to +5 volts dc is provided at terminal 1 via a resistor R8 from terminal 42, the potential at the output terminal 4 is forced to be 0 volts dc, regardless of the potentials at the comparitor input terminals 9 and 13, and the operation of the thyristor switching circuit 36 is inhibited. This inhibit input terminal feature is useful for temperature limit controlling.

Figure 3:
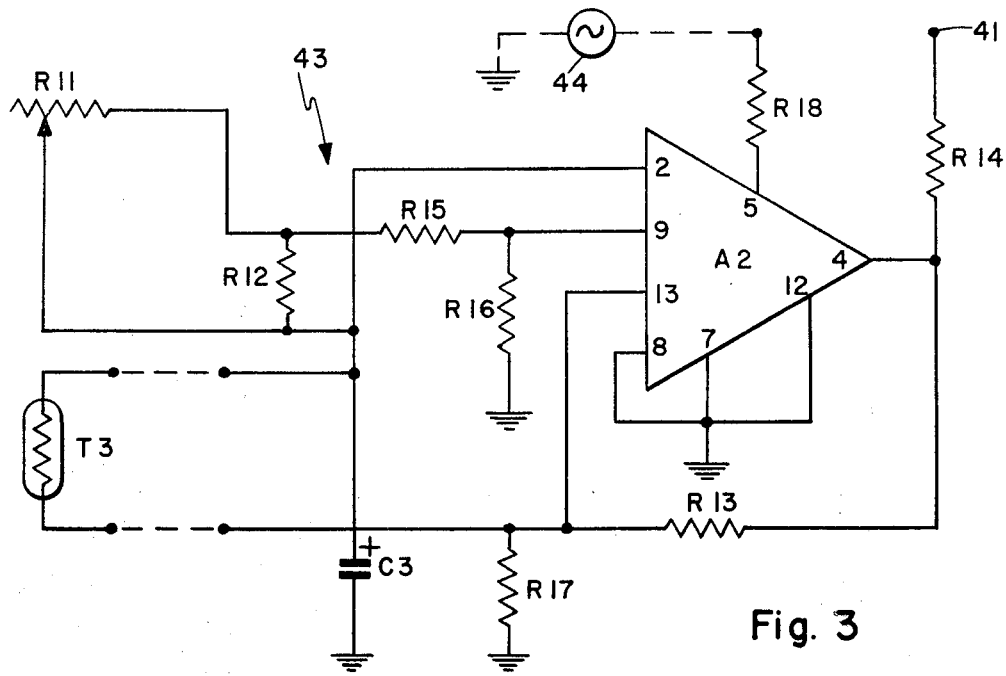
FIG. 3 is a schematic circuit diagram showing a high temperature limit controller for use in combination with the differential temperature controller shown in FIG. 2.

FIG. 3 shows a high temperature limit controller which may be used in conjunction with the controller 26 (FIG. 2) to limit the temperature of the water sump (such as a swimming pool), to a fixed value determined by the setting of a potentiometer R11. Potentiometer R11, connected in parallel with a resistor R12, provides a temperature limiting capability of 70° F to 130° F. An NTC thermistor sensor T3 is placed in thermal contact with the sump of which the temperature is being controlled. An integrated circuit zero voltage switch RCA CA3059 ) A2 is connected to function as a dc comparitor, in the same manner as the integrated circuit A1 (FIG. 2). The resistor R12 in parallel with the potentiometer R11, and the thermistor sensor T3, provide the required differential voltage signals to input terminals 9 and 13 respectively of the integrated circuit A2. When the sump temperature reaches a fixed value determined by the setting of the potentiometer R11, the dc potential at input terminal 13 of integrated circuit A2 becomes more positive than the potential at input terminal 9 of the integrated circuit A2, and the potential at the terminal 4 of the integrated circuit A2 goes from 0 volts dc to +5 volts dc. Positive feedback resistor R13 pulls the input terminal 13 potential more positive and effects a latching action, holding the output terminal 4 potential at the positive potential difference to provide a continuous direct current voltage signal. This direct current voltage signal is provided from the output terminal 4 of integrated circuit A2 via resistor R14 and terminal 41 to the inhibit input terminal 1 of the integrated circuit A1 of the differential temperature controller 26 (FIG. 2) via terminal 42 and resistor R8 to inhibit the integrated circuit A1 from furnishing a direct current voltage signal to the thyristor load switching circuit 36, to thereby inhibit the pump motor 25. The differential input resistor network 43 feedback resistor R13 produce a hysteresis in the system which acts to prevent oscillations at the output terminal 4 of the integrated circuit A2 when the potentials at the integrated circuit comparitor A2 differential inputs 9 and 13 are close to the same value. The resistor R11 is set to a fixed temperature limit value, and the output terminal 4 potential goes positive when that temperature is reached. Because of the hysteresis effect the output terminal 4 potential remains latched positive until the sump water temperature recedes to a value of about 9° F below the fixed temperature value. At this point, the potential at output terminal 4 switches back to 0 volts dc, integrated circuit A1 is no longer inhibited, and the temperatures sensed by the thermistors T1 and T2 of the differential temperature controller 26 (FIG. 2) are again allowed to control the thyristor switching circuit 36.

The values, ratings and/or identities of the components shown in FIG. 3 are as follows:

THERMISTOR

T3: 3,000 ohms, 25° C

RESISTORS

R12: 10,000 ohms
R13: 42,200 ohms
R14: 1,000 ohms
R15: 1,000 ohms
R16: 4,990 ohms
R17: 4,640 ohms
R18: 5,000 ohms

POTENTIOMETER

R11: 5,000 ohms

CAPACITOR

C3: 150 uf

INTEGRATED CIRCUIT

A2: RCA CA3059 The power source 44 provides 120 volts ac.

Figure 4:
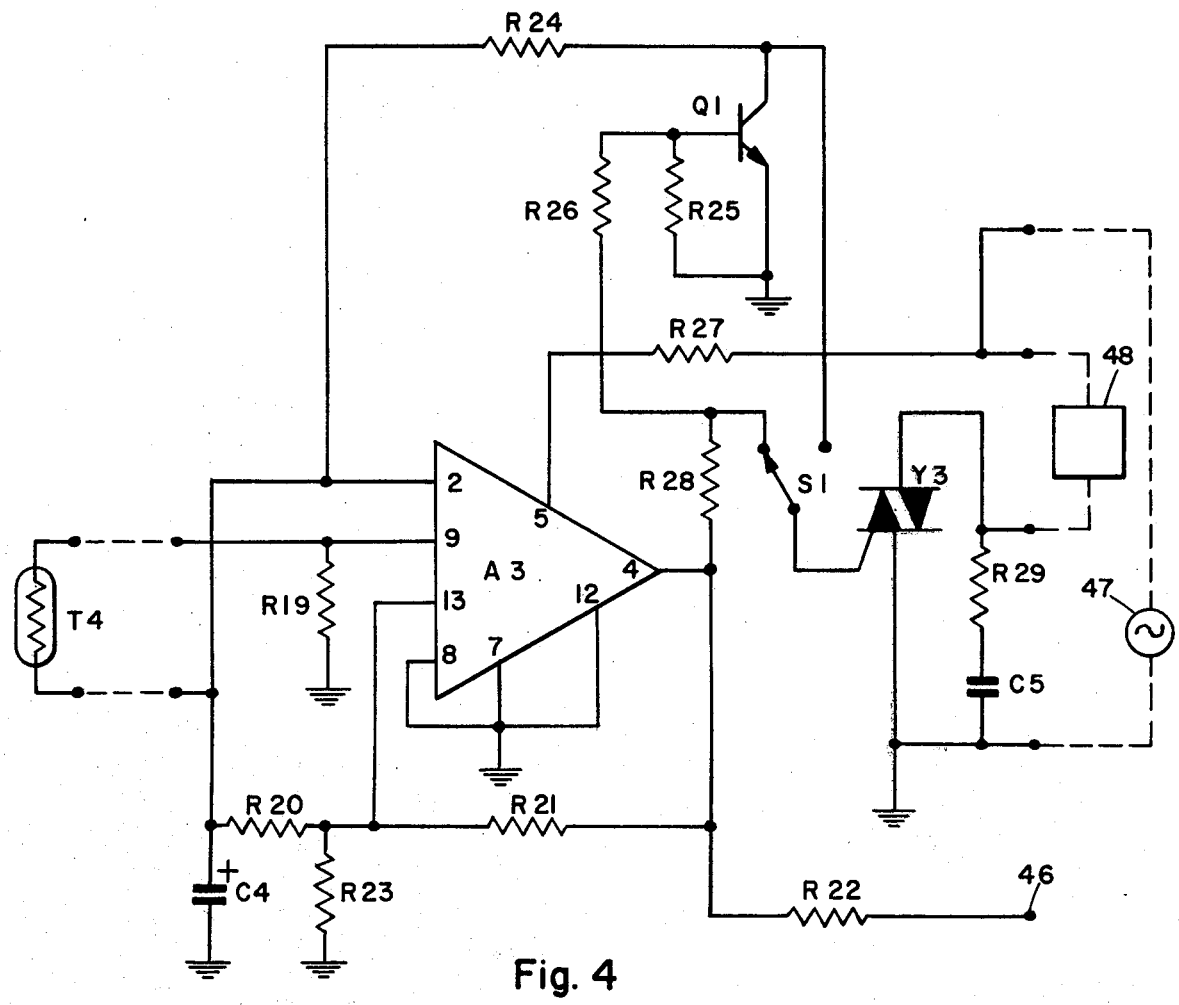
FIG. 4 is a schematic circuit diagram showing a low temperature limit controller for use in combination with the differential temperature controller shown in FIG. 2.

Referring to FIG. 4, a low temperature limit controller is designed to provide an inhibit signal at terminal 46 to be provided to the differential temperature controller 26 (FIG. 2) in order to ensure that the thyristor switching circuit 36 does not energize the pump motor 25 when freezing temperatures are encountered. In addition, a thyristor switch Y3 is employed to connect an ac power source 47 to actuate or deactuate solenoids 48 in the collector system 20 and dump the water contained in the collector and pipes 23 and 24 to prevent freeze damage.

An NTC thermistor sensor T4 contained in the collector system 20 senses the ambient temperature of the collector and accordingly provides a voltage signal representative of such temperature to an input terminal 9 of an integrated circuit A3. The integrated circuit A3 is connected to operate as a dc-comparator in the same manner of the integrated circuit A1 (FIG. 2). A resistor R20 is selected to provide a fixed potential to input terminal 13 of the integrated circuit A3. As the sensed collector temperature decreases toward 32° and the thermistor impedance increases, the potential at input terminal 9 of integrated circuit A3 decreases. The potential at the output terminal 4 of the integrated circuit A3 changes from 0 volts dc to a direct current voltage signal of +5 volts dc when the potential at input terminal 9 goes slightly below that at input terminal 13. Positive feedback is applied to input terminal 13 from the output terminal 4 of integrated circuit A3 via a resistor R21 to further pull the potential at the input terminal 13 more positive than that at input terminal 9, thus latching the integrated circuit A3 to continuously provide a direct current voltage signal at output terminal 4. This direct current voltage signal is provided via resistor R22 at terminal 46 to inhibit input terminal 1 of the integrated circuit A1 to inhibit the thyristor switching circuit 36 of the differential temperature controller 26 from energizing the pump motor 25. The pump motor 25 remains inhibited until the collector temperature recedes to a higher level to cause the dc-comparitor integrated circuit A3 to again provide a zero voltage output signal at output terminal 4.

The thyristor output switch Y3 also is controlled by the voltage signal at the output terminal 4 of the integrated circuit A3. When switch S1 is in the position shown in FIG. 4, the voltage signal at output terminal 4 of integrated circuit A3 directly controls the thyristor Y3, so that at above freezing temperatures, thyristor Y3 is in the open state, and at below freezing temperatures, it is activated to actuate the collector dump solenoids 48. The switch S1 can be used to select an inverted mode where the thyristor Y3 normally activates at above freezing temperatures by inverting the voltage signal provided at output terminal 4 of the integrated circuit A3 through an inverter-amplifier Q1. This allows the use of normally energized collector dump solenoids 48, which when de-energized will dump the system water. Through this scheme a power failure, as well as freezing temperatures, will automatically dump water from the collector system 20.

The hysteresis and latching effects of the low temperature limit controller of FIG. 4 are the same as for the high temperature limit controller (FIG. 3) and the differential temperature controller (FIG. 2).

The values, ratings and/or identities of the components shown in FIG. 4, are as follows:

RESISTORS

R19: 4,990 ohms
R20: 7,870 ohms
R21: 42,200 ohms
R22: 1,000 ohms
R23: 4,640 ohms
R24: 1,500 ohms
R25: 2,700 ohms
R26: 1,500 ohms
R27: 5,000 ohms
R28: 750 ohms
R29: 100 ohms

CAPACITORS

C4: 150 uf
C5: 0.068 uf

THERMISTOR

T4: 3,000 ohms, 25° C

INTEGRATED CIRCUIT

A3: RCA CA3059

THYRISTOR

Y3: RCA T2300B

TRANSISTOR

Q1: 2N3567 The power source 47 provides 120 volts ac.

The respective output terminals 41 and 46 of the high temperature limit controller (FIG. 3) and the low temperature limit controller (FIG. 4) can both be coupled through an OR gate to the inhibit input terminal 1 of the integrated circuit A1 of the differential temperature controller (FIG. 2).

Having described my invention, I now claim:

1. In a solar energy conversion systems, a controller for an electrical motor for a water pump for controlling circulation of water between a solar energy collector and a water storage sump in response to sensed predetermined differences between the temperature of the collector water and the temperature of the sump water, comprising:

first means for comparing said sensed temperatures and for providing a first indication when it is sensed that said collector water temperature has become greater than said sump water temperature by a first predetermined difference and a second indication when it is sensed that said collector water temperature has become greater than said sump water temperature by a second lesser predetermined difference;

second means for latching the first means to continuously provide said first indication from the time that it is sensed that the temperature of the collector water has become greater than the temperature of the sump water by said first predetermined difference until such time as it is sensed that the temperature of the collector water has become greater than the temperature of the sump water by said second lesser predetermined difference and for latching the first means to continuously provide said second indication from the time that said second lesser predetermined difference is sensed until such time as said first predetermined difference is sensed; and thyristor means for switching said pump motor into connection with an alternating current power source to cause circulation of said water when said first indication is provided by the first means and out of connection with said power source when said second indication is provided by the first means.

2. The controller according to claim 1, wherein the thyristor means comprises:

a first thyristor load switching element for switching said motor into connection with said power source in response to a gating signal, and a second thyristor in cascade with the first thyristor for providing said gating signal to the first thyristor when gated-on in response to said first indication provided by the first means.

3. The controller according to claim 2, wherein the first means, the second means and the thyristor means are enclosed within a metal casing, and a first thyristor has its individual case directly grounded to the outside of the metal casing for dissipating heat generated in said first thyristor.

4. The controller according to claim 2, wherein the first means comprises:

an integrated circuit for comparing said sensed temperatures and for providing a direct current voltage signal as said first indication when said first predetermined difference is sensed and a zero voltage signal as said second indication when said second predetermined difference is sensed.

5. The controller according to claim 4, wherein,
the first means comprises: a bridge circuit including a first input terminal of the integrated circuit for providing a voltage representative of said collector water temperature, a second input terminal of the integrated circuit for providing a voltage representative of said sump water temperature, and an output terminal of the integrated circuit for providing said direct current and zero voltage signals in response to a comparison of said voltages sensed at the first and second input terminals, with said direct current voltage signal being provided only when said voltage at the first input terminal is greater than said voltage at the second input terminal, and the second means comprises: a resistance connected between the output terminal and the first input terminal for increasing said voltage at the first input terminal when said direct current voltage signal is provided in response to sensing said first predetermined difference, and for decreasing said voltage at the first input terminal when said zero voltage signal is provided in response to sensing said second lesser predetermined difference.

6. The controller according to claim 5, wherein the integrated circuit of the first means includes an inhibit input terminal for receiving a signal for inhibiting the provision of a direct current voltage signal at the integrated circuit output terminal, further comprising:

third means for comparing said sensed sump water temperature with a fixed value and for inhibiting the first means integrated circuit from providing said direct current voltage signal when said sump water temperature becomes greater than said fixed value, said third means comprising:

a second integrated circuit for comparing said sump water temperature with said fixed value and for providing a second direct current voltage signal when it is sensed that said sump water temperature has become greater than said fixed value, a zero voltage signal when it is sensed that said sump water temperature has become less than said fixed value by a third predetermined difference, means for providing said second direct current voltage signal to the first means integrated circuit inhibit input terminal to inhibit the pump motor from circulating said water in response to said second direct current voltage signal provided by the second integrated circuit and for enabling the pump motor in response to said zero voltage provided by the second integrated circuit, and means for latching the second integrated circuit to continuously provide said second direct current voltage signal to inhibit the pump motor from the time that it is sensed that the temperature of the sump water has become greater than said fixed value until such time as it is sensed that the temperature of the sump water has become less than said fixed value by said third predetermined difference, and for latching the second integrated circuit to continuously provide said zero voltage signal to enable the pump motor from the time that said third predetermined difference from said fixed value is sensed until such time as it is sensed that the sump water temperature has become greater than said fixed value.

7. The controller according to claim 6, wherein the third means comprises:

a bridge circuit including a first input terminal of the second integrated circuit for providing a voltage representative of said sensed sump water temperature, a second input terminal of the second integrated circuit for providing a voltage representative of said fixed value, and an output terminal of the second integrated circuit for providing said second direct current and zero voltage signals in response to a comparison of said voltages sensed at the first and second input terminals, with said direct current voltage signal being provided only when said voltage at the first input terminal of the second integrated circuit is greater than said voltage at the second input terminal of the second integrated circuit; and a resistance connected between the output terminal and the first input terminal of the second integrated circuit for increasing said voltage at the first input terminal of the second integrated circuit when said second direct current voltage signal is provided in response to sensing that said sump water temperature has become greater than said fixed value, and for decreasing said voltage at the first input terminal of the second integrated circuit when said zero voltage signal is provided in response to sensing that said sump water temperature has become less than said fixed value by said third predetermined difference.

8. The controller according to claim 5, wherein the integrated circuit of the first means includes an inhibit input terminal for receiving a signal for inhibiting the provision of a direct current voltage signal at the integrated citcuit output terminal, further comprising:

third means for comprising said sensed collector temperature with a fixed value and for inhibiting the first means integrated circuit from providing said direct current voltage signal when said collector temperature becomes less than said fixed value, said third means comprising:

a second integrated circuit for comparing said collector temperature with said fixed value and for providing a second direct current voltage signal when it is sensed that said collector temperature has become less than said fixed value and a zero voltage signal when it is sensed that said collector temperature has become greater than said fixed value by a third predetermined difference, means for providing said second direct current voltage signal to the first means integrated circuit inhibit input terminal to inhibit the pump motor from circulating said water in response to said second direct current voltage signal provided by the second integrated circuit and for enabling the pump motor in response to said zero voltage provided by the second integrated circuit, and means for latching the second integrated circuit to continuously provide said second direct current voltage signal to inhibit the pump motor from the time that it is sensed that the temperature of the collector has become less than said fixed value until such time as it is sensed that the temperature of the collector has become greater than said fixed value by said third predetermined difference, and for latching the second integrated circuit to continuously provide said zero voltage signal to enable the pump motor from the time that said third predetermined difference from said fixed value is sensed until such time as it is sensed that the collector temperature has become less than said fixed value.

9. The controller according to claim 8, wherein the third means comprises:
   a bridge circuit including a first input terminal of the second integrated circuit for providing a voltage representative of said fixed value, a second input terminal of the second integrated circuit for providing a voltage representative of said sensed collector temperature, and an output terminal of the second integrated circuit for providing said second direct current and zero voltage signals in response to a comparison of said voltages sensed at the first and second input terminals, with said direct current voltage signal being provided only when said voltage at the first input terminal of the second integrated circuit is greater than said voltage at the second input terminal of the second integrated circuit; and
   a resistance connected between the output terminal and the first input terminal of the second integrated circuit for increasing said voltage at the first input terminal of the second integrated circuit when said second direct current voltage signal is provided in response to sensing that said collector temperature has become less than said fixed value, and for decreasing said voltage at the first input terminal of the second integrated circuit when said zero voltage signal is provided in response to sensing that said collector temperature has become greater than said fixed value by said third predetermined difference.

10. The controller according to claim 1, wherein first means comprises:
   an integrated circuit for comparing said sensed temperatures and for providing a direct current voltage signal as said first indication when said first predetermined difference is sensed and a zero voltage signal as said second indication when said second predetermined difference is sensed.

11. The controller according to claim 10, wherein,
   the first means comprises: a bridge circuit including a first input terminal of the integrated circuit for providing a voltage representative of said collector water temperature, a second input terminal of the integrated circuit for providing a voltage representative of said sump water temperature, and an output terminal of the integrated circuit for providing said direct current and zero voltage signals in response to a comparison of said voltage sensed at the first and second input terminals, with said direct current voltage signal being provided only when said voltage at the first input terminal is greater than said voltage at the second input terminal, and
   the second means comprises: a resistance connected between the output terminal for increasing said voltage at the first input terminal when said direct current voltage signal is provided in response to sensing said first predetermined difference, and for decreasing said voltage at the first input terminal when said zero voltage signal is provided in response to sensing said second lesser predetermined difference.

12. The controller according to claim 11, wherein the integrated circuit of the first means includes an inhibit input terminal for receiving a signal for inhibiting the provision of a direct current voltage signal at the integrated circuit output terminal, further comprising:
   third means for comparing said sensed sump water temperature with a fixed value and for inhibiting the first means integrated circuit from providing said direct current voltage signal when said sump water temperature becomes greater than said fixed value, said third means comprising:
   a second integrated circuit for comparing said sump water temperature with said fixed value and for providing a second direct current voltage signal when it is sensed that said sump water temperature has become greater than said fixed value, a zero voltage signal when it is sensed that said sump water temperature has become less than said fixed value by a third predetermined difference,
   means for providing said second direct current voltage signal to the first means integrated circuit inhibit input terminal to inhibit the pump motor from circulating said water in response to said second direct current voltage signal provided by the second integrated circuit and for enabling the pump motor in response to said zero voltage provided by the second integrated circuit, and
   means for latching the second integrated circuit to continuously provide said second direct current voltage signal to inhibit the pump motor from the time that is is sensed that the temperature of the sump water has become greater than said fixed value until such time as it is sensed that the temperature of the sump water has become less than said fixed value by said third predetermined difference, and for latching the second integrated circuit to continuously provide said zero voltage signal to enable the pump motor from the time that said third predetermined difference from said fixed value is sensed until such time as it is sensed that the sump water temperature has become greater than said fixed value.

13. The controller according to claim 12, wherein the third means comprises:
   a bridge circuit including a first input terminal of the second integrated circuit for providing a voltage representative of said sensed sump water temperature, a second input terminal of the second integrated circuit for providing a voltage representative of said fixed value, and an output terminal of the second integrated circuit for providing said second direct current and zero voltage signals in response to a comparison of said voltages sensed at the first and second input terminals, with said direct current voltage signal being provided only when said voltage at the first input terminal of the second integrated circuit is greater than said voltage at the second input terminal of the second integrated circuit; and 14. The controller according to claim 11, wherein the integrated circuit of the first means includes an inhibit input terminal for receiving a signal for inhibiting the provision of a direct current voltage signal at the integrated circuit input terminal, further comprising:

third means for comparing said sensed collector temperature with a fixed value and for inhibiting the first means integrated circuit from providing said direct current voltage signal when said collector temperature becomes less than said fixed value, said third means comprising:
- a second integrated circuit for comparing said collector temperature with said fixed value and for providing a second direct current voltage signal when it is sensed that said collector temperature has become less than said fixed value and a zero voltage signal when it is sensed that said collector temperature has become greater than said fixed value by a third predetermined difference,
- means for providing said second direct current voltage signal to the first means integrated circuit inhibit input terminal to inhibit the pump motor from circulating said water in response to said second direct current voltage signal provided by the second integrated circuit and for enabling the pump motor in response to said zero voltage provided by the second integrated circuit, and
- means for latching the second integrated circuit to continuously provide said second direct current voltage signal to inhibit the pump motor from the time that is is sensed that the temperature of the collector has become less than said fixed value until such time as it is sensed that the temperature of the collector has become greater than said fixed value by said third predetermined difference, and for latching the second integrated circuit to continuously provide said zero voltage signal to enable the pump motor from the time that said third predetermined difference from said fixed value is sensed until such time as it is sensed that the collector temperature has become less than said fixed value.

15. The controller according to claim 14, wherein the third means comprises:
- a bridge circuit including a first input terminal of the second integrated circuit for providing a voltage representative of said fixed value, a second input terminal of the second integrated circuit for providing a voltage representative of said sensed collector temperature, and an output terminal of the second integrated circuit for providing said second direct current and zero voltage signals in response to a comparison of said voltages sensed at the first and second input terminals, with said direct current voltage signal being provided only when said voltage at the first input terminal of the second integrated circuit is greater than said voltage at the second input terminal of the second integrated circuit; and
- a resistance connected between the output terminal and the first input terminal of the second integrated circuit for increasing said voltage at the first input terminal of the second integrated circuit when said second direct current voltage signal is provided in response to sensing that said collector temperature has become less than said fixed value, and for decreasing said voltage at the first input terminal of the second integrated circuit when said zero voltage signal is provided in response to sensing that said collector temperature has become greater than said fixed value by said third predetermined difference.

16. The controller according to claim 1, further comprising:
- third means for comparing said sensed sump water temperature with a fixed value and for inhibiting the first means from providing said first indication when said sump water temperature becomes greater than said fixed value.

17. The controller according to claim 16, further comprising:
- fourth means for comparing said sensed collector temperature with a second fixed value and for inhibiting the first means from providing said first indication when said collector temperature becomes less than said second fixed value.

18. The controller according to claim 1, further comprising:
- third means for comparing said sensed collector temperature with a fixed value and for inhibiting the first means from providing said first indication when said collector temperature becomes less than said fixed value.

19. In a solar energy conversion system, a controller for an electrical motor for a water pump for controlling circulation of water between a solar energy collector and a water storage sump in response to sensed predetermined differences between the temperature of the sump water and a fixed value, comprising:
- thyristor means for switching said pump motor into connection with an alternating current power source to cause circulation of said water;
- first means for comparing said sensed sump water temperature with a fixed value and for inhibiting the thyristor means from switching said pump motor into connection with said power source when said sump water temperature becomes greater than said fixed value, said first means comprising:
  - a bridge circuit including an integrated circuit having a first input terminal for providing a voltage representative of said sensed sump water temperature, a second input terminal for providing a voltage representative of said fixed value, and an output terminal for providing a direct current voltage signal in response to a comparison of said voltages sensed at the first and second input terminals, when said voltage at the first input terminal is greater than said voltage at the second input terminal and for providing a zero voltage signal in response to said comparison when said voltage at the first input terminal is not greater than said voltage at the second input terminal, and
  - means for inhibiting the thyristor means to thereby inhibit the pump motor when said direct current voltage signal is provided at the integrated circuit output terminal; and second means for latching the integrated circuit to continuously provide said direct current voltage signal to inhibit the pump motor from the time that it is sensed that the temperature of the sump water has become greater than said fixed value until such time as it is sensed that the temperature of the sump water has become less than said fixed value by a predetermined difference, and for latching the integrated circuit to continuously provide said zero voltage signal to enable the pump motor from the time that said predetermined difference from said fixed value is sensed until such time as it is sensed that the sump water temperature has become greater than said fixed value, said latching means comprising:

a resistance connected between the output terminal and the first input terminal of the integrated circuit for increasing said voltage at the first input terminal of the integrated circuit when said direct current voltage signal is provided in response to sensing that said sump water temperature has become greater than said fixed value, and for decreasing said voltage at the first input terminal of the integrated circuit when said zero voltage signal is provided in response to sensing that said sump water temperature has become less that said fixed value by said predetermined difference.

20. In a solar energy conversion system, a controller for an electrical motor for a water pump for controlling circulation of water between a solar energy collector and a water storage sump in response to sensed predetermined differences between the temperature of the collector and a fixed value, comprising:

thyristor means for switching said pump motor into connection with an alternating current course to cause circulation of said water;

first means for comparing said sensed collector temperature with a fixed value and for inhibiting the thyristor means from switching said pump motor into connection with said power source when said collector temperature becomes less than said fixed value, said first means comprising:

a bridge circuit including an integrated circuit having a first input terminal for providing a voltage representative of said fixed value, a second input terminal for providing a voltage representative of said sensed collector temperature, and an output terminal for providing a direct current voltage signal in response to a comparison of said voltages sensed at the first and second input terminals when said voltage at the first input terminal is greater than said voltage at the second input terminal, for providing a zero voltage signal in response to said comparison when said voltage at the second input terminal, and means for inhibiting the thyristor means to thereby inhibit the pump motor when said direct current voltage signal is provided at the integrated circuit output terminal; and second means for latching the integrated circuit to continuously provide said direct current voltage signal to inhibit the pump motor from the time that it is sensed that the temperature of the collector has become less than said fixed value until such time as it is sensed that the temperature of the collector has become greater than said fixed value by a predetermined difference, and for latching the integrated circuit to continuously provide said zero voltage signal to enable the pump motor from the time that said predetermined difference from said fixed value is sensed until such time as it is sensed that the collector temperature has become less than said fixed value, said latching means comprising:

a resistance connected between the output terminal and the first input terminal of the integrated circuit for increasing said voltage at the first input terminal of the integrated circuit when said direct current voltage signal is provided in response to sensing that said collector temperature has become less than said fixed value, and for decreasing said voltage at the first input terminal of the integrated circuit when said zero voltage signal is provided in response to sensing that said collector temperature has become greater than said fixed value by said predetermined difference.

21. A controller for switching an electrical load on and off in response to sensed predetermined differences between common physical characteristics of different sources, comprising:

first means for comparing said sensed common characteristics of two different sources and for providing a direct current voltage signal when a first predetermined difference between said characteristics has been sensed and a zero voltage signal when a second predetermined difference between said characteristics has been sensed, said first means comprising:

a bridge circuit including an integrated circuit having first and second input terminals for providing voltages representative of said sensed characteristics, and an output terminal for providing said direct current voltage signal in response to a comparison of said voltages at the first and second input terminals when said voltage at the first input terminal is greater than said voltage at the second input terminal, and for providing said zero voltage signal in response to said comparison when said voltage at the first input terminal is not greater than said voltage at the second input terminal; and thyristor means for switching an electrical load into connection with an electrical power source when said direct current voltage signal is provided at the integrated circuit output terminal and out of connection with said power source when said zero voltage signal is provided at the integrated circuit output terminal; and second means for latching the first means to continuously provide said direct current voltage signal from the time that said first predetermined difference has been sensed until such time as said second predetermined difference has been sensed, and for latching the first means to continuously provide said zero voltage signal from the time that said second predetermined difference has been sensed until such time as said first predetermined difference has been sensed, said second means comprising:

a resistance connected between the output terminal and the first input terminal of the integrated circuit for increasing said voltage at the first input terminal when said direct current voltage signal is provided in response to sensing said first predetermined difference, and for decreasing said voltage at the first input terminal when said zero voltage signal is provided in response to sensing said second predetermined difference.

22. The controller according to claim 21, wherein the thyristor means comprises:

a first thyristor load switching element for switching said load into connection with said power source in response to a gating signal, and a second thyristor in cascade with the first thyristor for providing said gating signal to the first thyristor when gated-on by said direct current voltage signal provided at the integrated circuit output terminal.

23. A controller for controlling the energization of an electrical load in response to sensed predetermined differences between a physical characteristic of a source and fixed value, comprising:

thyristor means for switching an electrical load into connection with an electrical power source, first means for comparing said sensed characteristic with said fixed value, for inhibiting the thyristor means from switching said load into connection with said power source when it has been sensed that said sensed characteristic has exceed said fixed value, said first means comprising:

a bridge circuit including an integrated circuit having first and second input terminals for providing voltages representative of said sensed characteristic and said fixed value, and an output terminal of the integrated circuit for providing a direct current voltage signal in response to a comparison of said voltages sensed at the first and second input terminals, when said voltage at the first input terminal is greater than said voltage at the second input terminal, and for providing a zero voltage signal in response to said comparison when said voltage at the first input terminal is not greater than said voltage at the second input terminal, and means for so inhibiting the thyristor means when said direct current voltage signal is provided at the integrated circuit output terminal; and second means for latching the integrated circuit to continuously provide said direct current voltage signal to inhibit the thyristor means from the time that it is sensed that said sensed characteristic has exceeded said fixed value until such time as it is sensed that said sensed characteristic has receded from said fixed value by a predetermined difference, and for latching the integrated circuit to continuously provide said zero voltage signal to enable the thyristor from the time that said predetermined difference from said fixed value is sensed until such time as it is sensed that said sensed characteristic has exceeded said fixed value, said latching means comprising:

a resistance connected between the output terminal and the first input terminal of the integrated circuit for increasing said voltage at the first input terminal of the integrated circuit when said direct current voltage signal is provided in response to sensing that said sensed characteristic has exceeded said fixed value, and for decreasing said voltage at the first input terminal of the integrated circuit when said zero voltage signal is provided in response to sensing that said sensed characteristic has receded from said fixed value by said predetermined difference.

* * * * *